United States Patent [19]

Fajula et al.

[11] Patent Number: 4,847,224

[45] Date of Patent: Jul. 11, 1989

[54] BINARY ZEOLITIC SYSTEMS, THEIR SYNTHESIS AND THEIR UTILIZATION

[75] Inventors: François Fajula, Theran; François Figueras, Montpellier; Claude Gueguen, Irigny; Roger Dutartre, Prades Le Lez, all of France

[73] Assignee: Elf France, Courbevoie, France

[21] Appl. No.: 64,321

[22] Filed: Jun. 19, 1987

[30] Foreign Application Priority Data

Jun. 24, 1986 [FR] France ............................ 86 09112

[51] Int. Cl.$^4$ ............................................. B01J 29/06
[52] U.S. Cl. ....................................... 502/67; 423/328
[58] Field of Search .......................... 502/67; 423/328

[56] References Cited

U.S. PATENT DOCUMENTS

| 3,366,578 | 1/1968 | Michalko | 502/67 |
| 3,773,690 | 11/1973 | Heinze et al. | 502/67 |
| 4,406,823 | 9/1983 | Laurent et al. | 502/67 |

FOREIGN PATENT DOCUMENTS 16832  1/1984  Japan ................................ 502/67

*Primary Examiner*—Carl F. Dees
*Attorney, Agent, or Firm*—Burgess, Ryan and Wayne

[57] ABSTRACT

The present invention concerns binary zeolitic systems comprising two zeolites A and B having different crystalline structures while having common structural units. The crystals of the zeolite A form a central core surrounded by a crown of crystals of zeolite B, the zeolites A and B being disposed concentrically and following the same longitudinal axis. These systems are formed by the introduction of a nucleation gel containing seeds of the zeolite A in a growth gel where the crystallization parameters are favorable to the crystallization of the zeolite B. The binary zeolitic systems are useful as catalysts for transforming hydrocarbons and more especially as cracking catalysts.

5 Claims, 2 Drawing Sheets

BINARY ZEOLITIC SYSTEMS, THEIR SYNTHESIS AND THEIR UTILIZATION

BACKGROUND OF THE INVENTION

Field of the invention

The present invention concerns binary zeolitic systems formed of two zeolites having different crystalline structures while having common structural units; it also concerns their synthesis method and their utilization.

The co-crystallization of two zeolites is a well known phenomenon in the art of zeolite synthesis. It results from the fact that in a medium favorable to their development, the zeolites are in metastable state. During nucleation or during the growth stage, several seeds can appear and develop, thus leading to the obtention of mixtures of zeolites. These mixtures generally evolve according to the rule known as the OSWALD rule which foresees that all systems evolve towards their stable state while passing through the intermediate or metastable states. By interrupting the crystallization at a given moment, this evolution ceases and it is possible to isolate a mixture of zeolite crystals in which each of the species constitutes a distinct phase easily identified by its morphology under microscopic examination. If the crystallization process is left to develop long enough, the metastable zeolites are transformed and only the stable zeolite is isolated in the medium.

The intergrowth phenomenon of the zeolite crystals is also known. It corresponds to a heterogeneous crystallization in which the crystals of a zeolite B appear sporadically during the crystallization of a zeolite A. Mircoscopic examination does not generally detect the zeolite intergrowths. These are evidenced by microdiffraction studies in which zones of the zeolite B appear as defects in the structure of the zeolite A. The best known example of intergrowth is that of the zeolite T which issues from the intergrowth of offretite and erionite. Since the intergrowth leads to a perturbation in the form and/or the size of the cages and channels, the zeolite AB obtained will have different properties from the two zeolites of which it is formed.

Both the co-crystallization and the intergrowth of the crystals appear spontaneously and do not lead to products than can be used on an industrial scale.

BRIEF DESCRIPTION OF THE INVENTION

A novel binary zeolitic system has now been developed which presents considerable industrial interest.

The binary zeolitic system according to the invention comprises two zeolites, A and B, having different crystalline structures while having common structural units, characterized in that the crystals of zeolite A forming a central core are surrounded by a crown or ring of crystals of zeolite B, the zeolites A and B being disposed concentrically and following the same longitudinal axis.

DETAILED DESCRIPTION OF THE INVENTION

Figure 1:

By the expression "structural unit", is meant the cages and channels that form the crystalline structure of the zeolites. The formation of binary zeolitic systems according to the invention becomes possible if a single structural unit forms part of the crystalline structure of the two zeolites.

In these systems, the contact surface between the two zeolites A and B is great while the distance between the two structures will be reduced. The mechanical properties are improved through the existence of a chemical bond. These two characteristics are particularly important for catalytic applications. These solids cannot be differenciated by simple physical mixtures, formed by co-crystallization simply on the basis of their X-ray diffractograms. However, their aspect determined by electronic scanning microscopy is characteristic. The microphotography reveals that each particle is comprised of a central core of a zeolite A, surrounded by a ring of a zeolite B, the two zeolites being disposed along a single longitudinal axis.

The synthesis process of such binary zeolitic systems, comprising two zeolites A and B having common structural units, is characterized in that a nucleation gel containing seeds of zeolite A is introduced into a growth gel where the crystallization parameters are favorable to the crystallization of zeolite B.

The nucleation gel comprises an alumina source, a silica source and at least one nucleation cation. It is utilized after aging accompanied by the formation of seeds of the zeolite A. The growth gel can be identical in its composition to the fresh nucleation gel through often its differs therefrom by the nature of the concentration of the nucleation cations.

Among the parameters that lead to the crystallization of a given zeolite, the most important are the nature and the concentration of the nucleation cations around which develop the cages and channels of a zeolite. The crystallization temperature can also determine the nature of the zeolite formed.

In the growth gel, the crystallization parameters are selected in such a manner that zeolite B is thermodynamically more stable. It is surprising that the seeds of zeolite A introduced into this medium are not transformed into crystals of zeolite B according to the OSWALD rule.

This phenomenon can have several explanations, related to the size of the crystals or their small contact surface with the medium. Since the number of crystals formed is limited by the quantity of seeds introduced, the zeolite is obtained in the form of monocrystals having a size close to one micron. The thermal and chemical stability of a zeolite increases with the size of the crystals. According to the other explanation, the growth of zeolite B at the surface of zeolite A, thermodynamicallly stable in the medium, ensures the protection of said zeolite A.

The formation of binary zeolitic systems according to the invention is possible between said couple of zeolites having common structural units.

The case of an offretite-zeolite omega and mordenite-zeolite omega will now be described.

In the case of the offretite and omega zeolite, the common structural units are the gmelinite cages and the six tetrahedral $TO_4$ cycles. The crystalline network of offretite is distinguished by a pore system of $6.4 \cdot 10^{-10}$ m diameter according to the the longitudinal axis of the channels, while in the omega zeolite the pores have an opening close to $8 \cdot 10^{-10}$ m. It is in this association of two zeolites with different channel openings that lies the interest of these systems as catalysts.

Firstly, the seeds of the offretite are formed in a gel containing a silica and alumina source, and potassium and tetramethylammonium (TMA) ions in the following proportions expressed in oxide moles:

2.38-15.8 $K_2O$; 0.6-9.3 $TMA_2O$; $Al_2O_3$;
5-40 $SiO_2$; 380-1320 $H_2O$.

The cancrinite cages of the offretite are built around the potassium ions and the gmelinite cages around the tetramethylammonium ions.

After aging of this gel, accompanied by formation of offretite seeds, 1 to 10% of this gel and preferably 2 to 5% is introduced into a growth gel, which does not contain any tetramethylammonium ion and where the potassium is replaced by sodium. The composition of this gel is the following:

4–8 Na$_2$O; Al$_2$O$_3$; 10–20 SiO$_2$; 160–400 H$_2$O

There is formation of offretite up to the exhaustion of the potassium ions, then, due to the epitaxy relation that is established between the two structures, the crystals of the omega zeolited grow at the surface of the offretite around the sodium ions. The total zeolite content is set by the alumina content of the mixture.

In the omega zeolite-mordenite binary system, the common structural units are combinations of five and four tetrahedral TO$_4$ cycles.

The nucleation gel contains furthermore silica and alumina sources and sodium and tetramethylammonium ions used in the following proportions:

3–10 Na$_2$O; 0.1–3 TMA$_2$O; Al$_2$O$_3$; 10–30 SiO$_2$; 160–700 H$_2$O

After aging, this gel containing the seeds of the omega zeolite is introduced into a growth gel of the same composition but free of tetramethylammonium ions. Then, 2 to 25% and preferably 5 to 15% of nucleation gel is introduced into the growth gel. The mixture is maintained at a temperature that encourages the growth of the mordenite. After exhaustion of the tetramethylammonium ions, the mordenite begins to crystallize in fine needles surrounding the omega zeolite core. The pores of the mordenite present windows of 6.6 to 7.10$^{-10}$ m while the pores of the omega zeolite present windows close to 8.10$^{-10}$ m.

The binary zeolitic systems according to the invention are useful as catalysts, especially for use in refining operations such as catalytic cracking.

Conventional cracking catalysts supply in addition to the gasoline desired, a large quantity of gas. Thus, on zeolite ZSM-5 manufactured of MOBIL there is formation of about 45% of gasoline having an octane number of 97 and of about 20% gas.

The utilization of mixed zeolitic systems according to the invention prevents excessive cracking and thus the formation of gas.

By using a binary system comprising an offretite core surrounded by an omega zeolite, for the catalytic cracking of hydrocarbon-baased feeds, the bulky molecules can enter into the large pores of the omega zeolite where they are subjected to cracking. In turn, the small molecules formed by cracking can enter into the smaller pores of the offretite. These small molecules are isomerized in the offretite, so improving the octane number of obtained gasoline.

The following examples illustrate the invention without however limiting it.

EXAMPLE 1

Offretite and omega zeolite binary system.

A first gel A allowing the development of offretite nuclear was prepared from 15 g of water, 2.2 g of KOH, 3.05 g of TMAOH,5H$_2$O (TMA=tetramethylammonium), 0.73 of metakaolinite (purified kaolinite from Charentes calcinated at 500° C. in an at air during 10 hours) and 2.63 g of silica (Rhône Poulenc silica gel, 660 m$^2$g$^{-1}$); this leads to the stoichiometry:

6 K$_2$O; 2.56 TMA$_2$O; Al$_2$O$_3$; 15.3 SiO$_2$; 280 H$_2$O

A growth gel B (gel B) was prepared from 15 g of water, 1.57 g of NaOH, 0.73 g of metakaolinite and 2.63 g of silica; this leads to the following stoichiometry;

5.97 Na$_2$O; Al$_2$O$_3$; 15.3 SiO$_2$; 253 H$_2$O

From aged gel A and fresh gel B two mixtures AB were prepared, one of which contains 2.5% of gel A, and the other of which contains 5%. These mixtures were tranferred into glass flasks, sealed and maintained in a drying oven at 110° C. for 72 h without stirring. After washing and drying the obtained precipitates present the X-ray diffraction diagrams of fully crystallized products in which can be identified the characteristics bands of the offretite and omega zeolites (table I). According to the relative intensity of these bands it is possible to estimate that the solid prepared from the mixture containing 2.5% of gel A contains 80% of omega zeolite and 20% of offretite and that the solid prepared from the mixture containing 5% of gel A contains 50% of offretite and 50% of omega zeolite. (These values are only estimates, the quantitative analysis on the single basis of the X-ray diffractograms being relatively inaccurate).

Figure 2:

FIGS. 1 and 2 represent micrographs of the solid obtained by crystallization of the mixture containing 5% of gel A obtained under a CAMBRIDGE S-100 scanning microscope with two different enlargements (22,000 and 38,000). The particles and about 1.5 μm in diameter for 2 μm in length. They are constituted by an offretite core surrounded by needles of omega zeolite. The two zeolites developed along the longitudinal axis C of their hexagonal system.

The chemical analysis of this sample gives the following composition, expressed in oxide moles:

0.22 K$_2$O; 0.48 Na$_2$O; 0.28 TMA$_2$O; Al$_2$O$_3$; 7.1 SiO$_2$; x H$_2$O

The exchange of sodium and tetramethylammonium ions by ammonium acetate and several calcinations in an atmosphere of air at 500° C. did not affect the crystalline structures of the product.

EXAMPLE 2

Binary system of omega zeolite and mordenite.

Operating proceeds such as mentioned in example 1. A gel A was prepared from 21.7 g of H$_2$O; 2.2 g of NaOH, 2.51 g of TMAOH, 5 H$_2$O; 1.0 g of kaolinite and 4.16 g of silica, to obtain:

7.2 Na$_2$O; 1.8 TMA$_2$O; Al$_2$O$_3$; 20 SiO$_2$; 315 H$_2$O

This gel was aged either during 120 to 500 days at ambient temperature or during 5 to 100 days at 50° C. A second gel B was prepared in a similar manner to that of gel A and from these same constituents with the exception of TMAOH, 5 H$_2$O; this leads to:

7.2 Na$_2$O; Al$_2$O$_3$; 20 SiO$_2$; 305 H$_2$O

Figure 3:
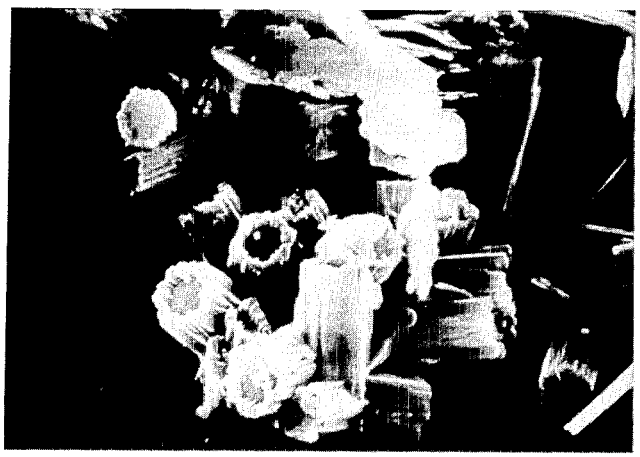
Figure 4:

A mixture AB is prepared with 10% of gel A that is crystallized in a sealed flask without stirring at 145° C. for 18 hours. The washed and dried solid leads to the X-ray diffractogram given in table 2 in which the characteristic bands of the omega zeolite and the mordenite are shown. The examination under electronic microscope shows that the particles of 0.5 to 1 μm in width and 2 to 4 μm in length which are obtained are constituted by an omega zeolite core in the form of prismatic monocrystals surrounded by mordenite needles. As in example 1 the two zeolite develop according to their axis C. FIGS. 3 and 4 represent microphotographs of the solid obtained on a CAMBRIDGE S-100 scanning microscope with two enlargements (10,000 and 18,000).

After calcination in an atmosphere of dry air at 950° C. for one hour the sample retains its crystallinity and the appearance of the particles is not modified.

TABLE 1

Analysis and indexation of the X-ray diffractogram of the sample described in example 1 (5% of gel A)

| Diffractogram of the sample | | Reference Diffractogram | | | |
|---|---|---|---|---|---|
| | | offretite | | omega | |
| DÅ | (I/I$_o$ × 100) | (hkl) | dÅ | (hkl) | dÅ |
| 15.1 | (7) | | | (100) | 15.8 |
| 11.41 | (34) | (100) | 11.41 | (110) | |
| 9.11 | (37) | | | (110) | 9.09 |
| 7.82 | (8) | | | (200) | 7.87 |
| 7.79 | (11) | (001) | 7.60 | | |
| 6.78 | (15) | | | (101) | 6.86 |
| 6.60 | (29) | (110) | 6.59 | | |
| 6.32 | (19) | (101) | 6.29 | | |
| 5.94 | (10) | | | (210) | 5.94 |
| 4.69 | (18) | | | (211) | 4.69 |
| 4.55 | (23) | (201) | 4.54 | | |
| 4.33 | (28) | (210) | 4.31 | | |
| 3.96 | (11) | | | (400) | 3.91 |
| 3.76 | (100) | (002) | 3.74 | (002) | 3.79 |
| 3.57 | (58) | (102) | 3.56 | | |
| 3.51 | (57) | | | (112) | 3.51 |
| 3.33 | (22) | (301) | 3.38 | | |
| 3.30 | (17) | (320) | 3.29 | | |
| 3.15 | (58) | | 3.13 | (500) | 3.13 |
| 3.07 | (26) | | | (302) | 3.07 |
| 3.02 | (20) | | | (420) | 3.02 |
| 2.91 | (49) | | | (510) | 2.91 |
| 2.84 | (70) | | 2.83 | | |
| 2.76 | (13) | | | (402) | 2.76 |
| 2.49 | (6) | | | (520) | 2.51 |

Spectrometer: CGR Theta 60
Radiation Cu Kα

TABLE 2

Analysis and indexation of the X-ray diffractogram of the sample described in example 2

| Diffractogram of the sample | | Reference Diffractogram | | | |
|---|---|---|---|---|---|
| | | omega | | mordenite | |
| DÅ | (I/I$_o$ × 100) | (hkl) | dÅ | (hkl) | dÅ |
| 16.831 | (14) | (100) | 15.84 | | |
| 13.517 | (7) | | | (110) | 13.4 |
| 10.301 | (12) | | | (020) | 10.2 |
| 9.1834 | (90) | (100) | 9.07 | (200) | 9.02 |
| 8.0256 | (23) | (200) | 7.86 | | |
| 6.8434 | (20) | (101) | 6.86 | | |
| 6.6613 | (18) | | | (111) | 6.50 |
| 6.3614 | (6) | | | (130) | 6.32 |
| 6.0046 | (51) | (210) | 5.94 | (021) | 6.02 |
| 5.8622 | (5) | | | (201) | 5.15 |
| 5.5413 | (6) | (201) | 5.47 | | |
| 5.3040 | (10) | (300) | 5.23 | | |
| 5.0576 | (4) | | | (221) | 5.03 |
| 4.9015 | (1) | | | (131) | 4.84 |
| 4.1260 | (47) | (211) | 4.67 | | |
| 4.5529 | (15) | | | (330) | 4.50 |
| 4.3965 | (12) | (310) | 4.36 | | |
| 4.0223 | (29) | | | (041) | 4.12 |
| 3.9621 | (16) | (400) | 3.92 | (420) | 3.97 |
| 3.8208 | (100) | (002) | 3.78 | (150) | 3.81 |
| 3.7199 | (27) | (102) | 3.69 | (241) | 3.13 |
| 3.6302 | (50) | (320) | 3.60 | | |
| 3.5227 | (75) | (112) | 3.50 | (002) | 3.52 |
| 3.4909 | (47) | | | (112) | 3.45 |
| 3.4292 | (29) | (202) | 3.42 | | |
| 3.4060 | (33) | | | (501) | 3.37 |
| 3.3681 | (16) | | | (022) | 3.27 |
| 3.2406 | (39) | (321) | 3.25 | (202) | 3.21 |
| 3.1661 | (96) | (500) | 3.14 | (060) | 3.15 |
| 3.0909 | (25) | (302) | 3.07 | | |
| 3.0475 | (40) | (420) | 3.02 | | |

TABLE 2-continued

Analysis and indexation of the X-ray diffractogram of the sample described in example 2

| Diffractogram of the sample | | Reference Diffractogram | | | |
|---|---|---|---|---|---|
| | | omega | | mordenite | |
| DÅ | (I/I$_o$ × 100) | (hkl) | dÅ | (hkl) | dÅ |
| 2.9896 | (19) | (501) | 2.96 | | |
| 2.9208 | (76) | (510) | 2.90 | | |
| 2.6618 | (12) | (402) | 2.64 | | |
| 2.6255 | (7) | (511) | 2.64 | | |
| 2.5700 | (9) | (322) | 2.60 | | |
| 2.5337 | (15) | (520) | 2.51 | | |
| 2.3791 | (6) | (332) | 2.36 | | |
| 2.2761 | (12) | (440) | 2.26 | | |

EXAMPLE 3

This example concerns the catalytic cracking tests of a petroleum cut.

The catalytic tests consist in the processing in a pilot plant of a hydrocarbon-based feed from the vacuum distillation of a petroleum residue. This pilot plant is described in standard ASTM D 3907.80 (MAT technique).

However, the operating conditions understand the phenomena more severe in order to better understand the phenomena produced during catalytic cracking in an industrial plant. The operating conditions are the following:

| | |
|---|---|
| temperature of the catalytic bed | 530° C. |
| weight of the catalyst | 3 grams |
| reaction time | 20 seconds |
| weight of the feed in grams per hour and per gram of catalyst | 30 |

The effluents are recovered at the outlet of the reactor and analyzed by chromatography in gaseous phase. The coke formed at the surface of the catalyst is analyzed by combustion.

The characteristics of the feed used for the tests are given herein-below:

| | |
|---|---|
| density at 15° C. | 0.9226 |
| sulfur content | 2.46% |
| Conradson residue | 0.4% |
| refraction index at 20° C. | 1.5098 |
| aniline point | 77.8° C. |
| distillation according to the standard ASTM D 1160 | |
| PI | 272° C. |
| 10% | 355° C. |
| 50% 432° C. | |
| 80% | 482° C. |
| MP | 520° C. |

Prior to the tests, the catalysts are subjected to a processing intended to transform them so as to be comparable to catalysts issuing from the regeneration zone of an industrial catalytic cracking plant. During this regeneration operation, the catalyst is in the presence of water vapor and under the action of the high temperature, its structure is transformed. The processing consists in subjecting the catalyst to a temperature of 775° C. for 17 hours under a 100% water vapor atmosphere.

Four catalytic cracking tests have been performed on different catalyst formulations.

Test 1

The catalyst used during this test can be considered as conventional. It is constituted by 15% by weight of zeolite Y of which a part of the sodium ions has been replaced by lanthanum ions.

The composition of the exchanged zeolite Y is the following:

$SiO_2$: 57.3%; $Al_2O_3$: 19.9%; $Na_2O$: 4.0%; $La_2O_3$: 18.8%

The zeolite is dispersed in a silica-alumina type matrix.

Test 2

The catalyst used during this test is obtained through mechanical mixture of the preceding catalyst and of a offretite synthetized according to French Pat. No. 83 03 804 with 5% by weight of offretite in the finished catalyst.

Test 3

In this test the catalyst of test 1 has been used to which has been added 5% of a zeolite T resulting from the intergrowth of offretite and erionite.

Test 4

In this test the catalyst of test 1 is mixed mechanically with a binary zeolitic system according to the present invention.

In order to prepare this catalyst, operating proceeds in the following manner:

An alumina solution constituted by 75 g of $Al_2O_3$ per liter is added drop by drop to a silica solution containing 53.1 g of sodium trisilicate in 580 g of water. There is flocculation and formation of a gel. The mixture is stirred and then the pH is adjusted by addition of ammonia. The zeolite Y which has previously been exchanged is added to the silica-alumina gel obtained. The resulting gel is filtered, washed and dried in the oven at 125° C. The product is thereafter ground until the obtention of grains having a diameter of less than 250 μm and then exchanged with a solution of 3% by weight of ammonium sulfate. The final preparation steps are constituted by washing, drying and calcination of 500° C. for 12 hours. The product obtained was mixed with 5% of binary zeoilte prepared according to example 1. The results of the tests are given to the following table:

| Test n° | 1 | 2 | 3 | 4 |
|---|---|---|---|---|
| Conversion (*) | 69.8 | 71.2 | 69.6 | 70.9 |
| Gasoline ($C_5$ to $C_{12}$) | 47.0 | 46.0 | 46.8 | 48.9 |
| Gas ($C_1$ to $C_4$) | 16.5 | 18.5 | 16.5 | 16.4 |
| Coke | 3.8 | 3.1 | 4.2 | 2.7 |
| Hydrogen | 0.05 | 0.04 | 0.05 | 0.06 |

(*) in % by weight of the transformed charge.

The utilization of the binary zeolite described in the invention results in an improvement in the selectivity in gasoline and a decrease in the coke content for a conversion level that is more or less constant.

The utilization of the offretite alone results in decreasing the coke content while the amount of gas produced is increased.

It appears that the zeolite T containing defects due to crystalline intergrowth has practically no effect upon the catalytic cracking, presumably due to the rapid clogging of its pores by the coke formed.

The MAT technique such as utilized in the previous examples does ont allow however to determine the quality of the petroleum cut produced. This is the reason by an experiment in a fluid bed pilot plant built under licence from the U.S. company ATLANTIC RICHFIELD has been realized. This pilot plant is a fluid bed pilot plant simulating an industrial plant comprising a reaction zone and a regeneration zone. The fluidization and the circulation of the catalyst are ensured by nitrogen and air streams in the different sections of the pilot plant.

Two tests are carried out: test no. 5 and test no. 6, under identical conditions and using the same distillate feed from the distillation under reduced pressure of an atmospheric residue of the DJENO crude.

The characteristics of the feed are the following:

| | |
|---|---|
| density at 15° C. | 0.9247 |
| sulfur content (in % by weight) | 2.46 |
| nitrogen content (ppm) | 1,830 |
| aniline point (°C.) | 97 |
| Conradson residue (%) | 0.31 |
| distillation IP (°C.) | 340 |
| MP | 532 |

The operating conditions prevailing for the pilot plant was the following:

| | |
|---|---|
| temperature | 515° C. |
| weight of Feed in gram per hour and per gram of catalyst | 20 |
| coke content of the catalyst at the outlet of the regenerator | 0.05 |
| flow-rate of the catalyst with respect to the flow-rate of the feed (weight/weight) | 6 |

Test 5

In this test, the catalyst is an equilibrium catalyst issuing from an industrial plant. It contains 20% of zeolite Y exchanged with rare earths, the remainder being constituted by a silica-alumina type matrix. The size of the particles is comprised between 40 and 120 μm.

Due to the industrial operation, this catalyst is loaded with metals according to the following composition:

| | |
|---|---|
| nickel | 810 ppm |
| vanadium | 1320 ppm |
| sodium | 3060 ppm |

Test 6

A mixture of the catalyst according to test 5 with 2.5% of the binary zeolite prepared according to example 1 which has been disactivated with water vapor according to the previously described processing is prepared.

The results are given herein-below. In particular, the octane number of the gasoline is measured according to the standards of the prior art using the RFC motor, described in: P. Wuithier "Raffinage et Génie Chimique" I, p. 15 (Editions Technip 1965).

| Test n° | 5 | 6 |
|---|---|---|
| Conversion (*) | 72.5 | 72.2 |

-continued

| Test n° | 5 | 6 |
|---|---|---|
| Contents (*): | | |
| $H_2$ | 0.36 | 0.32 |
| Hydrocarbon in $C_1$ | 0.73 | 0.76 |
| saturated hydrocarbon in $C_2$ | 1.02 | 1.25 |
| saturated hydrocarbon in $C_3$ | 0.64 | 0.48 |
| unsaturated hydrocarbon in $C_3$ | 3.86 | 4.60 |
| Isobutane | 2.35 | 2.40 |
| Normal butane | 0.4 | 0.8 |
| Butenes | 5.13 | 6.8 |
| Total of the gases | 14.6 | 17.4 |
| Gasoline ($C_5$ - 220° C.) | 53.0 | 54.8 |
| Coke | 4.9 | 4.5 |
| Octane number | 92.5 | 94.3 |

(*) % by weight of the charge.

The catalyst of test no. 6 presents the remarkable effect of improving the gasoline content with conversion levels and coke formation the are more or less constant. It is surprising that the increase of the gasoline content is also accompanied by an improvement of the octane number.

What is claimed is:

1. A binary zeolitic system comprising two zeolites, A and B, having different crystalline structures while having common structural units, wherein the crystals of the zeolite A forming a central core are selected from the group consisting of offretite and omega zeolite and are surrounded by a crown or ring of crystals of zeolite B, which are selected from the group consisting of omega zeolite and mordenite, the zeolites A and B being disposed concentrically and following the same longitudinal axis.

2. A binary zeolitic system according to claim 1, wherein the zeolite A forming the central core is offretite, and the zeolite B that forms the crow is omega zeolite.

3. A binary zeolitic system according to claim 1, wherein the zeolite A forming the central core is the omega zeolite and the zeolite B which forms the crown is mordenite.

4. A method for synthesizing zeolitic systems according to claim 1, wherein a nucleation gel containing seeds of zeolite A is introduced into a growth gel where the crystallization parameters are favorable to the crystallization of zeolite B.

5. A method according to claim 4, wherein the crystallization parameters favorable to the crystallization of the zeolite B are the nature or the concentration of the nucleation cation or the temperature.

* * * * *

UNITED STATES PATENT AND TRADEMARK OFFICE
CERTIFICATE OF CORRECTION

PATENT NO. : 4,847,224

DATED : July 11, 1989

INVENTOR(S) : Francois Fajula, et al

It is certified that error appears in the above-identified patent and that said Letters Patent is hereby corrected as shown below:

Column 6, lines 25-29 (third full paragraph) should correctly read:

--However, the operating conditions were rendered more severe in order to better understand the phenomena produced during catalytic cracking in an industrial plant. The operating conditions are the following: --

Signed and Sealed this

Third Day of March, 1992

Attest:

HARRY F. MANBECK, JR.

Attesting Officer

Commissioner of Patents and Trademarks